April 5, 1960  R. M. SHAVER ET AL  2,931,323
HATCH ARRANGEMENT
Filed July 29, 1954  2 Sheets-Sheet 1
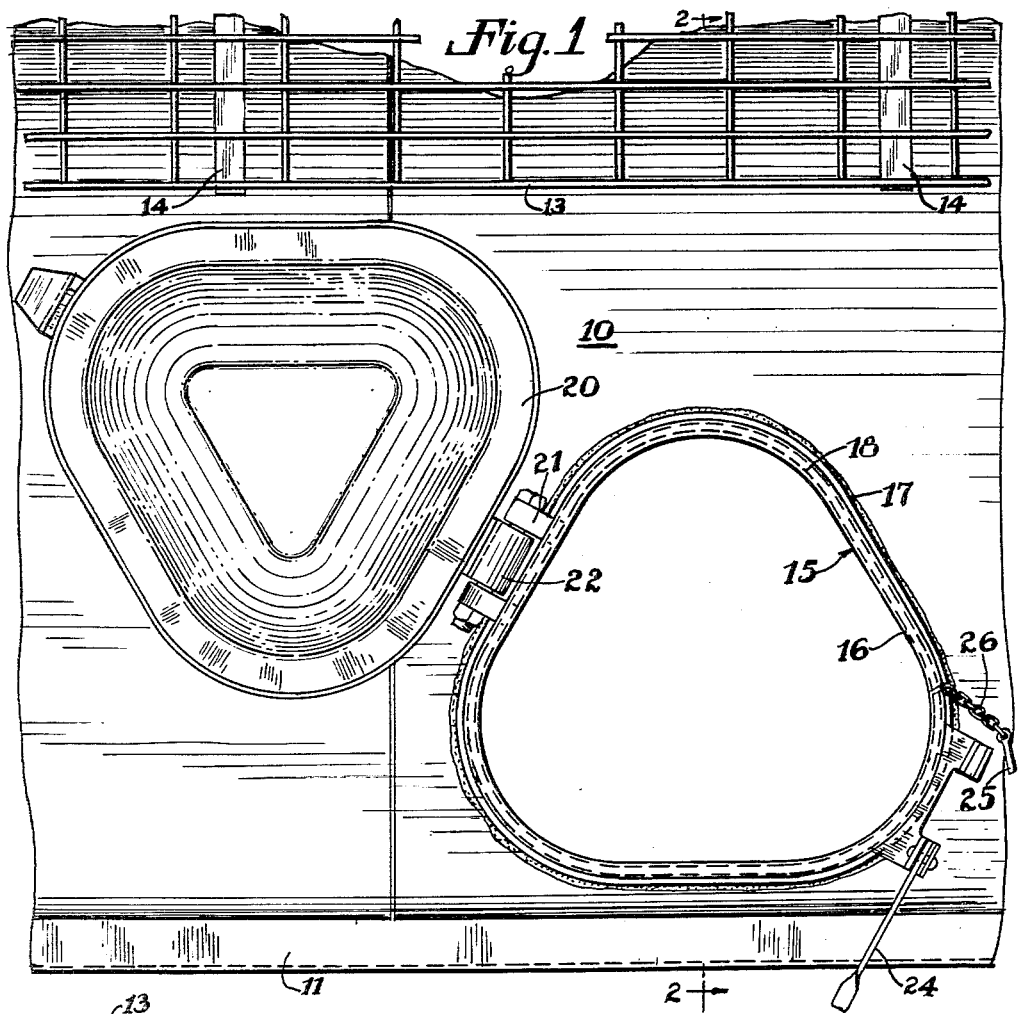
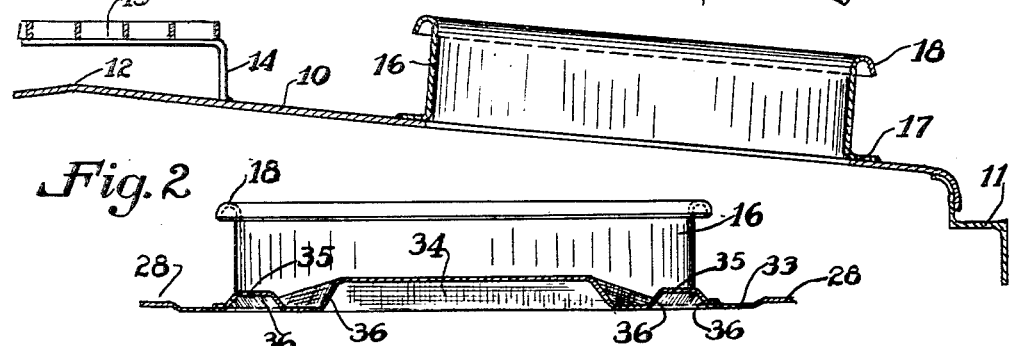
Inventors
Archie M. Miers
& Raymond M. Shaver
By Wayne Morris Russell
Attorney

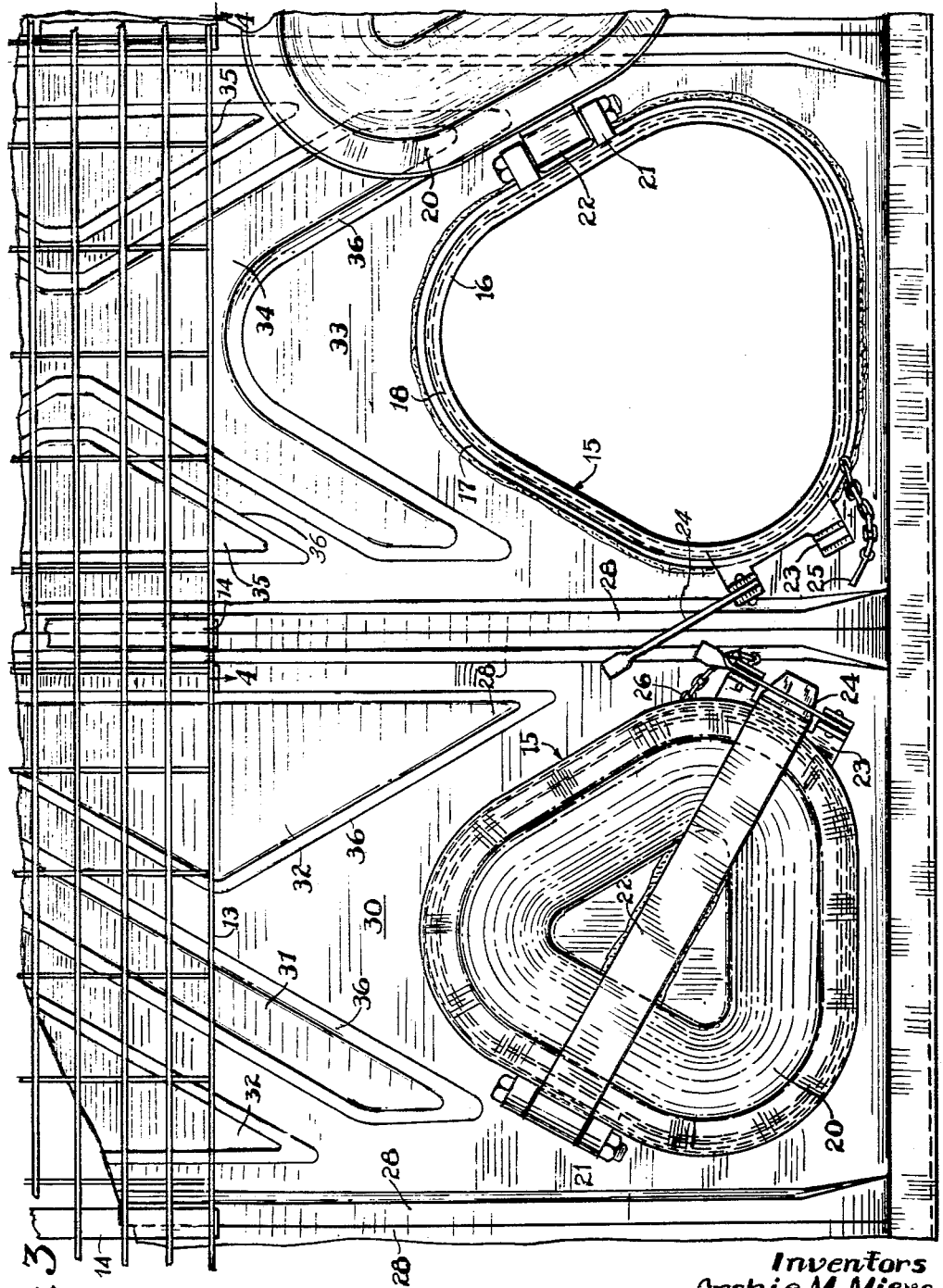

United States Patent Office 2,931,323
Patented Apr. 5, 1960

2,931,323

HATCH ARRANGEMENT

Raymond M. Shaver, Michigan City, Ind., and Archie M. Miers, Homewood, Ill., assignors to Pullman-Standard Car Manufacturing Company, Chicago, Ill., a corporation of Delaware Application July 29, 1954, Serial No. 446,434

9 Claims. (Cl. 108—5.4)

The present invention relates to a hatchway arrangement for a covered railway freight car or like vehicle, and more particularly to such an arrangement in which a triangular or other polygonal hatch frame is employed to obtain novel and improved structural and operating advantages.

It is an object of the present invention to provide a hatchway arrangement for a railway house car or like freight vehicle which avoids entrapment of foreign matter.

Another object is the provision of a hatchway arrangement for a railway house car or like freight vehicle having reinforcing corrugations in the roof, by which the reinforcement of the roof by the corrugations is enhanced.

Another object is the provision of a hatchway arrangement for a gable-roofed freight vehicle having raised portions on the roof such that the arrangement provides a downhill channel for downhill passage of foreign matter about the hatchway.

Still another object is the provision of a hatchway arrangement for a gable-roofed freight vehicle having raised reinforcing portions on the roof such that the arrangement provides a channel to enhance reinforcement of the roof and to direct foreign matter downhill about the hatchway.

It is also an object of the invention to provide for use in a gable-roofed freight vehicle a ridged roof sheet with a raised reinforcing corrugation and a hatchway defining a channel with the corrugation to provide passage about the hatchway and to enhance the reinforcement of the sheet.

Another object is the provision for use in a roofed freight vehicle of a roof sheet having a raised reinforcing portion and a hatchway of shape and location to define with the raised portion a channel for directing material past the hatchway and for enhancing the reinforcement of the sheet.

A further object is the provision of a hatchway arrangement for a roofed freight vehicle in which a hatch frame of angular shape is disposed with a corner thereof directed toward the longitudinal center line of the roof to allow ready movement of foreign matter past the frame and the hatch cover therefor is arranged to swing to open position spaced from the center line to leave the central roof area clear for safe use.

Another object is the provision of a hatchway arrangement for a gable-roofed freight vehicle with a triangular hatch frame disposed with a corner thereof directed uphill for ready movement of foreign matter past the frame and a hatch cover hinged along one of the hatch frame sides meeting at the uphill corner to swing to open position with an uphill edge generally parallel to and downhill from the roof ridge for clearance of the ridge area.

Still another object is the provision of a hatchway arrangement for a railway house car or the like having a running board extending over the ridge of the roof including a triangular hatch frame with a corner directed toward the ridge for ready movement of foreign matter past the frame and a correspondingly shaped hatch cover hinged along one of the hatch frame sides meeting at the uphill corner swingable to open position clear of the running board with an uphill edge generally parallel to the ridge to leave the running board clear for safe use.

A further object of the invention is the provision of a hatchway arrangement for a railway house car or the like having a running board disposed over the ridge of the roof and a raised reinforcing portion on the roof, in which a generally polygonal hatch frame has a corner directed uphill toward the ridge and a side parallel to the raised portion to provide a downhill channel directing foreign matter past the hatch frame and enhancing the roof reinforcement, and a hatch cover is hinged along the hatch frame swingable to open position clear of the running board for safe unimpeded use of the running board.

Other and further objects, advantages and features of the invention will be apparent to those skilled in the art from the following description, in conjunction with the accompanying drawings, in which:

Fig. 1 is a fragmentary plan view of the roof of a covered hopper car, showing a triangular hatchway with the cover in open position;

Fig. 2 is a vertical transverse sectional view taken substantially as indicated by the line 2—2 of Fig. 1;

Fig. 3 is a fragmentary plan view of the roof of a refrigerator or like car, showing two dissimilarly corrugated roof sheets side by side, each with a triangular hatchway applied thereto; and Fig. 4 is a vertical longitudinal sectional view taken substantially as indicated by the line 4—4 of Fig. 3.

The invention is illustrated as embodied in a generally triangular hatch frame applied to the roof of a railway freight car, one side of the hatch frame extending adjacent and parallel to a side of the car and the corner opposite that hatch frame side being directed uphill toward the ridge of the roof. A triangular hatch cover is hinged along one of the other sides of the hatch frame and swings to open position with one corner directed downhill away from the ridge and an uphill edge, that opposite the downhill corner, extending parallel to the ridge and spaced downhill therefrom so as to clear the running board. In this manner, accumulation of dirt, debris and moisture at the uphill portion of the hatch frame leading to corrosion and similar harmful effects on the roof is avoided because such foreign matter may readily move downhill past the frame, and the running board is left clear and unimpeded so that it may be used safely. As also illustrated, the triangular hatchway arrangement, when incorporated in a roof having diagonal reinforcing corrugations therein, provides not only the advantages just described, but cooperates with such corrugations to enhance the roof reinforcement by disposition of one or both of the sides meeting at the uphill corner of the frame parrallel to one or more of the corrugations, as the case may be, so as to define a channel or channels therewith. Such channel or channels add to the rigidity of the roof adjacent the side of the car, and in addition direct foreign matter about the hatch frame. The hatch frame further lends itself to assembly with an individual roof sheet for application as a unit to the car.

Referring to the drawings, there is shown in Fig. 1 part of the roof 10 of a covered hopper car formed of flat steel sheets welded together in abutting relation. As usual in railway freight cars, a ridged or gable roof is provided, sloping downwardly to the side plates 11 on each side from the longitudinally central ridge 12, as best shown in Fig. 2. A longitudinal running board 13 extending over the ridge is supported above the roof as by brackets 14 or the like.

A plurality of hatches 15 are provided in the roof on both sides of the ridge, spaced longitudinally of the car, one of these hatches being shown in Fig. 1 and two in Fig. 3. Each comprises a hatchway opening in the roof, of generally triangular shape with the corners rounded. A hatch frame 16, corresponding in size and shape to the opening, is secured to the roof to provide a coaming for the hatch opening projecting above the roof level. In the particular embodiment illustrated, the hatch frame is provided with an outwardly extending flange 17 about its lower edge which overlies and is welded or otherwise secured to the marginal portion of the roof defining the hatch opening, although the hatch frame may be of a form to extend downwardly through the opening into the interior of the car and be secured in place by any suitable means. The upper edge of the hatch frame 16 curves outwardly and downwardly to form a flange 18 which provides a rounded bead surface for seating of a hatch cover 20 of triangular shape hinged along one side of the hatch frame in any suitable manner. As shown, the cover is pivotally mounted on the hatch frame itself by a hinge bracket 21 welded to a side of the frame with a hinge strap 22 swingably secured between ears of the bracket by means of any suitable pin extending through the ears. The strap 22 extends across the hatch cover, with each end projecting beyond the periphery of the cover, and is welded to a central raised portion or embossment of the cover. The free end of the hinge strap 22 is formed into a downwardly offset lip for latching of the cover in closed position, by engagement with a suitable latch provided adjacent the hatch frame corner opposite the side along which the cover is hinged. In the present case, a latch support bracket 23 is welded to the hatch frame. The bracket has a pair of spaced extensions projecting outwardly from the frame on each of which a pair of parallel upstanding ears are provided. A latch bar 24 is pivoted at one end between one pair of ears so that it may swing over the hinge strap lip and have its other end engage between the other pair of ears. This pair of ears and the latch bar have apertures registering in the locking position of the bar for the reception therethrough of a seal pin 25, as shown at the left in Fig. 3. The seal pin is attached to the hatch frame as by a chain 26. Although not shown, provision is made for the application of a pilferage-preventing seal as well known in the art. The hinge strap 22 is adapted to apply pressure to the cover when locked so that the cover is held in tight sealing engagement on the seat provided therefor.

The hatches 15 are arranged each with one side thereof adjacent and parallel to the proximate side plate 11, and the angle or corner opposite such side directed uphill toward the ridge 12, as clearly shown in the drawings. By reason of such disposition of the hatches, water, snow, dirt and other foreign matter readily passes downhill about the hatch frames, leaving the entire roof substantially clean. The absence of accumulations of moisture and moisture-holding dirt minimizes the corrosive and other deleterious effects often resulting from prior hatch arrangements, so that the effective service life of the roof is greatly lengthened and the need for repairs due to this cause is practically eliminated. With the usual rectangular hatches disposed with two sides parallel to the roof ridge and side plates, which is the common prior practice, movement of foreign matter off the roof is blocked by the uphill sides of the hatches, and the trapped matter accumulates adjacent these sides to cause corrosive and like damage.

The disclosed arrangement has further advantages in the disposition of the hatch covers 20. By hinging each cover along one of the sides of the hatch frame 16 which define or meet at the uphill corner, as shown in the drawings, and locating each hatch near the side plate 11, the cover swings to an open position clear of the running board 13 with one of its edges uphill and parallel to the running board and the roof ridge 12. The running board is thus left unimpeded so that it may be used safely by workers, as in loading of the car. The cover is also easily accessible from the running board for swinging to closed position. At the same time, a reduction in the space required by the open hatch is effected by reason of the staggered or relatively lapping disposition of the hatch and cover longitudinally of the car resulting from the hinging of the cover along a hatch frame side extending diagonally of the roof sheet. In other words, the greatest dimension of the hatch and cover together when open is along a line at an angle to a line longitudinal of the roof, so that the longitudinal extent of the hatch and cover is less than if they were disposed with their greatest combined dimension lengthwise of the roof. This is clearly evident from Figs. 1 and 3. There is thus provided a greatly increased area of clear, safe roof space available for working purposes. In addition, the hatch arrangement avoids any possibility of the covers or latch bars projecting beyond the side clearance limits of the car.

Although commonly a hatch frame is applied to a car roof after the roof has been assembled on the car, it is within the purview of this invention to provide a roof sheet with a hatch or hatches applied, either with the hatch cover and latch included or not, as a sub-assembly for application to the car or other vehicle as a unit, since the advantages of the hatch arrangement inhere in the individual roof sheets as well as in the eroof as a whole.

In Fig. 3, there is illustrated the application of the invention to a railway car roof, such as that of a refrigerator car, formed with corrugations or embossments which reinforce and rigidify the roof. In such a roof, the hatch arrangement of this invention provides improved results in addition to those already described. In the figure, two differently corrugated roof sheets are shown side by side, each incorporating the hatch of this invention for illustrative purposes, although in practice hatches would not ordinarily be located in adjacent sheets. It has been proposed to form corrugated roof sheets with the corrugations, or certain portions of the corrugations, extending diagonally in order to brace the roof against weaving and other stresses. The two roof sheets illustrated in Fig. 3 present two different forms or arrangements of diagonal corrugations. Each sheet extends from one side plate 11 to the other and is bent midway between its ends to provide the desired pitch of ridged or gable roof, and has its longitudinal edge portions 28, extending transversely of the car, slightly offset upwardly to cooperate with the similarly raised edges 28 of adjacent sheets in strengthening the roof at the seams. The sheet 30 at the left in Fig. 3 has a single diagonal corrugation 31 centered in the sheet and extending across the ridge, and a pair of triangular corrugations 32 along its side edges, each having an outer side adjacent and parallel to the edge of the sheet, and two inner sides, one of which is parallel to the diagonal corrugation, and the other of which is at an angle thereto, as will be clear from the figure. The other sheet 33, at the right, has a central cruciform corrugation 34, with a pair of triangular embossments or corrugations 35 along its side edges similar to the corrugations 32 of the sheet 30, each with the two inner sides thereof parallel to adjacent arms of the corrugation 34. The several corrugations are of appreciable depth, raised above the level of the roof a considerable distance, as will be apparent from Fig. 4. The top surfaces are preferably substantially flat and are connected by upstanding webs 36 to the sheet portions left at the general roof level.

As will be evident from Fig. 3, the diagonal corrugation 31 and the inner sides of the triangular corrugations 32 parallel thereto define diagonally extending channels and provide in the sheet 30 four upstanding webs parallel to each other to impart the desired strength and resistance to stresses. The channels provide for good drainage of moisture from the ridge 12 downhill toward the eaves of the roof, as well as allowing unimpeded passage of other foreign matter. The other inner side of each embossment or corrugation 32 extends at substantially the same angle relative to the center line of the sheet as the corrugation 31, but in the opposite direction, so that a more or less triangular flat area of the sheet is defined between these portions, into the uphill corner of which one of the channels debouches. The hatch 15 incorporated in the roof sheet 30 lies in this triangular area, with its uphill corner projecting between the downhill ends of the corrugations 31 and 32. The sides of the hatch frame 16 defining or meeting at this uphill corner extend substantially parallel to the adjacent upstanding webs 36 of these corrugations, and thus define therewith diverging channels leading past the hatch.

Not only is the passage of foreign matter about the hatch thus provided for as in the case of an uncorrugated roof, but a more positive cleaning action results under favorable conditions from the greater velocity imparted to water or air currents flowing through the channels by reason of the restriction and direction thereof by the channels. The main advantage of the hatch and embossed or corrugated roof arrangement, however, is that the hatch frame sides parallel to the corrugations serve to increase the reinforcement of the sheet afforded by the corrugations, particularly at the eave areas. In this manner, the separate advantages of the corrugations and of the hatch arrangement are enhanced by the combined construction.

Substantially the same results are obtained in the case of the sheet 33 as with sheet 30. The double diagonal or cruciform embossment 34 defines downhill channels with the inner sides of the triangular corrugations 35, and the pairs of diverging arms of the cruciform corrugations on opposite sides of the roof ridge 12 define generally triangular flat areas as in the case of the sheet 30, although the specific location and relation of the channels is not identical to those of the channels in sheet 30. For example, the triangular embossments 35 have both inner sides forming channels with the cruciform corrugation, so that the latter has channels along its entire length on both sides, and the channels do not open into the triangular areas. As appears from Fig. 4, the cruciform corrugation 34 and the inner sides of the corrugations 35 provide four upstanding webs 36 at the portions adjacent the ridge area of the sheet, but as evident from Fig. 3, they provide six such webs at the portion downhill of the junction of the arms of the central embossment. Such differences result from the provision of a cruciform corrugation to provide diagonal bracing in both directions against weaving stresses in the roof, and do not affect the advantageous results flowing from the arrangement of the hatches 15 and the roof corrugations. The uphill corner of the hatch 15 as shown in Fig. 3 projects between the downhill ends of the adjacent pair of diverging arms of the corrugation 34 so that the hatch frame defines therewith channels leading about the frame and enhances the reinforcement of sheet 33 by the corrugations, substantially as in the case of sheet 30 and its corrugations.

It will be evident that other arrangements of corrugations including diagonal corrugations or parts of corrugations for cooperation with a hatch according to this invention may be employed instead of those provided in the sheets 30 and 33, if desired. Similarly, although the hatches are illustrated as formed in the shape of generally equilateral triangles, they may be of other triangular form, or of some other polygonal shape than triangular, and retain most, if not all, of the advantages of the invention.

What is claimed is:

1. In a railway freight car having a gable roof and a running board extending longitudinally over the roof ridge, a plurality of generally triangular hatchways on each side of the running board each extending above the roof level and including a hatch opening in the roof and a hatch frame providing a coaming for the opening disposed with one side thereof adjacent and generally parallel to an eave and the corner thereof opposite said one side directed uphill toward the ridge and also including a generally triangular hatch cover hinged along one of the other sides of the hatch frame swingable to open position clear of the running board with the edge thereof adjacent the running board generally parallel to the ridge, and reinforcing corrugations in the roof having upstanding webs with at least certain of the corrugations extending adjacent and generally parallel to other of the sides of the hatch frames to provide with said other hatch frame side channels enhancing reinforcement of the roof adjacent the eaves and directing foreign matter downhill about the hatch frames.

2. In a freight vehicle having a gable roof, a generally triangular hatchway extending above the roof level and including a hatch opening in the roof and a hatch frame providing a coaming for the opening disposed with one side substantially parallel to an eave and one corner directed uphill toward the roof ridge and also including a generally triangular hatch cover hinged along one of the other sides of the hatch frame to swing between a position closing the hatchway and an open position with an edge thereof generally parallel to the ridge, said hatchway being spaced from the ridge so that said side of the cover in open position is apparently spaced from the ridge, and a raised portion on the roof defined by upstanding surfaces disposed with an upstanding surface substantially parallel to one of said other sides of the hatchway to define therewith a channel for downhill passage of foreign matter therepast and for rigidifying of the roof.

3. In a freight car having a gable roof and a longitudinal running board extending over the ridge, a generally triangular hatchway located adjacent an eave extending above the roof level and including a hatch opening in the roof and a hatch frame providing a coaming for the opening disposed with one side generally parallel to and adjacent said eave and the corner opposite said one side directed uphill toward the ridge and also including a generally triangular hatch cover hinged along one of the other sides of the hatch frame swingable to open position clear of the running board with the edge of the cover adjacent the running board generally parallel to the ridge, whereby foreign matter may readily pass downhill about the hatchway and the running board is kept clear for safe use upon opening of the hatchway.

4. In a railway freight car having a roof, a generally triangular hatchway extending above the roof level located between the longitudinal center line of the roof and a roof side edge including a hatch opening in the roof and a hatch frame providing a coaming for the opening disposed with one side adjacent and generally parallel to said roof side edge and the corner opposite said one side directed toward said center line, and strengthening corrugations in the roof with certain of the corrugations extending adjacent and generally parallel to the other sides of the hatch frame, whereby said other hatch frame sides enhance, adjacent said roof side edge, the reinforcement of the roof by the corrugations.

5. In a freight vehicle having a roof, a generally triangular hatchway extending above the roof level located between the longitudinal center line of the roof and one of the roof side edges including a hatch opening in the roof and a hatch frame providing a coaming for the opening disposed with one side thereof adjacent and generally parallel to said roof side edge and the corner opposite said one side directed toward said center line, and reinforcing corrugations in the roof disposed with certain of the corrugations extending adjacent and generally parallel to the other sides of the hatch frame, whereby said other hatch frame sides enhance, adjacent said roof side edge, the reinforcement of the roof by the corrugations.

6. In a railway freight car having a roof and a running board extending longitudinally centrally thereof, a generally triangular hatchway located between the longitudinal center line of the roof and a roof side edge including a hatch opening in the roof and a hatch frame providing a coaming for the opening disposed with one side thereof adjacent and generally parallel to said roof side edge and the corner thereof opposite said one side directed toward said center line and also including a generally triangular hatch cover hinged along one of the other sides of the hatch frame swingable to open position clear of the running board with the edge of the cover adjacent the running board generally parallel to said center line to leave the running board clear for safe use upon opening of the hatchway.

7. In a freight vehicle having a roof, a generally triangular hatchway located between the longitudinal center line of the roof and roof side edge including a hatch opening in the roof and a hatch frame providing a coaming for the opening disposed with one side thereof adjacent and generally parallel to said roof side edge and the corner thereof opposite said one side directed toward said center line and also including a generally triangular hatch cover hinged along one of the other sides of the hatch frame swingable to open position with an edge thereof generally parallel to and spaced from said center line to leave the longiutdinally central area of the roof safely clear upon opening of the hatchway.

8. A roof sheet for a gable-roof freight vehicle, comprising a sheet bent along a ridge line thereof, reinforcing corrugations in the sheet extending generally diagonally thereof, a generally triangular hatchway in the sheet between the ridge line and an eave edge thereof including a hatch opening in the sheet and a hatch frame providing a coaming for the opening disposed with one side thereof adjacent and generally parallel to said eave edge and the corner thereof opposite said one side of the hatch frame directed toward the ridge line and with the other sides of the hatch frame adjacent and generally parallel to the diagonally extending corrugations to provide therewith channels about the hatch frame and to enhance in the eave area the reinforcement of the sheet by the corrugations.

9. In a roofed freight vehicle, a generally triangular hatchway located between a center line of the roof and a roof edge paralleling the center line extending above the roof level and including a hatch opening in the roof and a hatch frame providing a coaming for the opening disposed with one side thereof generally parallel to said roof edge and the corner opposite said one side directed toward said center line and also including a generally triangular hatch cover hinged along one of the other sides of the hatch frame to swing in a plane extending at an angle between the planes of said roof center line and roof edge.

References Cited in the file of this patent
UNITED STATES PATENTS
2,309,237    Campbell _____ Jan. 26, 1943